United States Patent [19]
Chin et al.

[11] Patent Number: 4,887,846
[45] Date of Patent: Dec. 19, 1989

[54] SUBSEA TUBULAR JOINT

[75] Inventors: Arthur H. Chin; William M. Taylor, both of Houston, Tex.

[73] Assignee: Cameron Iron Works USA, Inc., Houston, Tex.

[21] Appl. No.: 184,665

[22] Filed: Apr. 22, 1988

[51] Int. Cl.$^4$ .................................................. F16L 13/4
[52] U.S. Cl. ........................................ 285/18; 285/96; 285/370; 285/382.4
[58] Field of Search ................... 285/382.5, 382.4, 258, 285/18, 96, 97, 370

[56] References Cited

U.S. PATENT DOCUMENTS

| | | | |
|---|---|---|---|
| 2,015,081 | 9/1935 | McElhany et al. | 285/97 X |
| 2,083,842 | 6/1937 | Henning | 285/97 X |
| 2,816,211 | 12/1957 | Hutchins | 285/382.5 X |
| 3,023,995 | 3/1962 | Hopkins | 285/97 X |
| 3,190,679 | 6/1965 | Lester | 285/97 X |
| 3,429,587 | 2/1969 | Kish | 285/18 |
| 3,727,954 | 4/1978 | Oliver | 285/168 |
| 3,923,324 | 12/1975 | Cruickshank et al. | 285/381 X |
| 4,142,581 | 3/1979 | Yoshitomi et al. | 285/382.4 X |
| 4,195,865 | 4/1980 | Martin | 285/18 |
| 4,388,752 | 6/1983 | Vinciguerra et al. | 285/382.5 X |
| 4,593,448 | 6/1986 | Aggradi et al. | 285/382.5 X |
| 4,648,626 | 3/1987 | Vinciguerra et al. | 285/382.5 X |
| 4,662,663 | 5/1987 | Schmitz | 285/382.5 |
| 4,696,494 | 9/1987 | Schmitz et al. | 285/18 |
| 4,720,124 | 1/1988 | Taylor et al. | 285/18 |

FOREIGN PATENT DOCUMENTS 2312310 12/1976 France ............................... 285/382.4
264706 2/1950 Switzerland ..................... 285/382.4

Primary Examiner—Thomas F. Callaghan

[57] ABSTRACT

The improved joint of the present invention includes a first tubular member having a central bore, a counterbore, and an axially extending first rim having an interior land and groove recess therein and internal seal means near the end of said first rim, a second tubular member having a central bore, a counterbore, an axially extending second rim having an outer diameter less than the inner diameter of said first rim on said first tubular member, an external sealing surface near the base of said second rim and an axially facing stop shoulder at the base of said second rim and extending outward from the exterior of said second rim, a sleeve positioned within and spaced slightly inward from said second rim and sealed to the interior of said second rim at a position near the base thereof and at a position near the outer end thereof, and a port extending through said second tubular member providing communication between the exterior of said second tubular member and the space between said sleeve and the interior of said second rim and a fitting secured in the exterior opening of said port for receiving a pressure fluid hose releasably thereon. With this configuration, fluid under pressure applied to said port causes said second rim to be forced outwardly into said land and groove recess on the interior of said first rim.

11 Claims, 5 Drawing Sheets

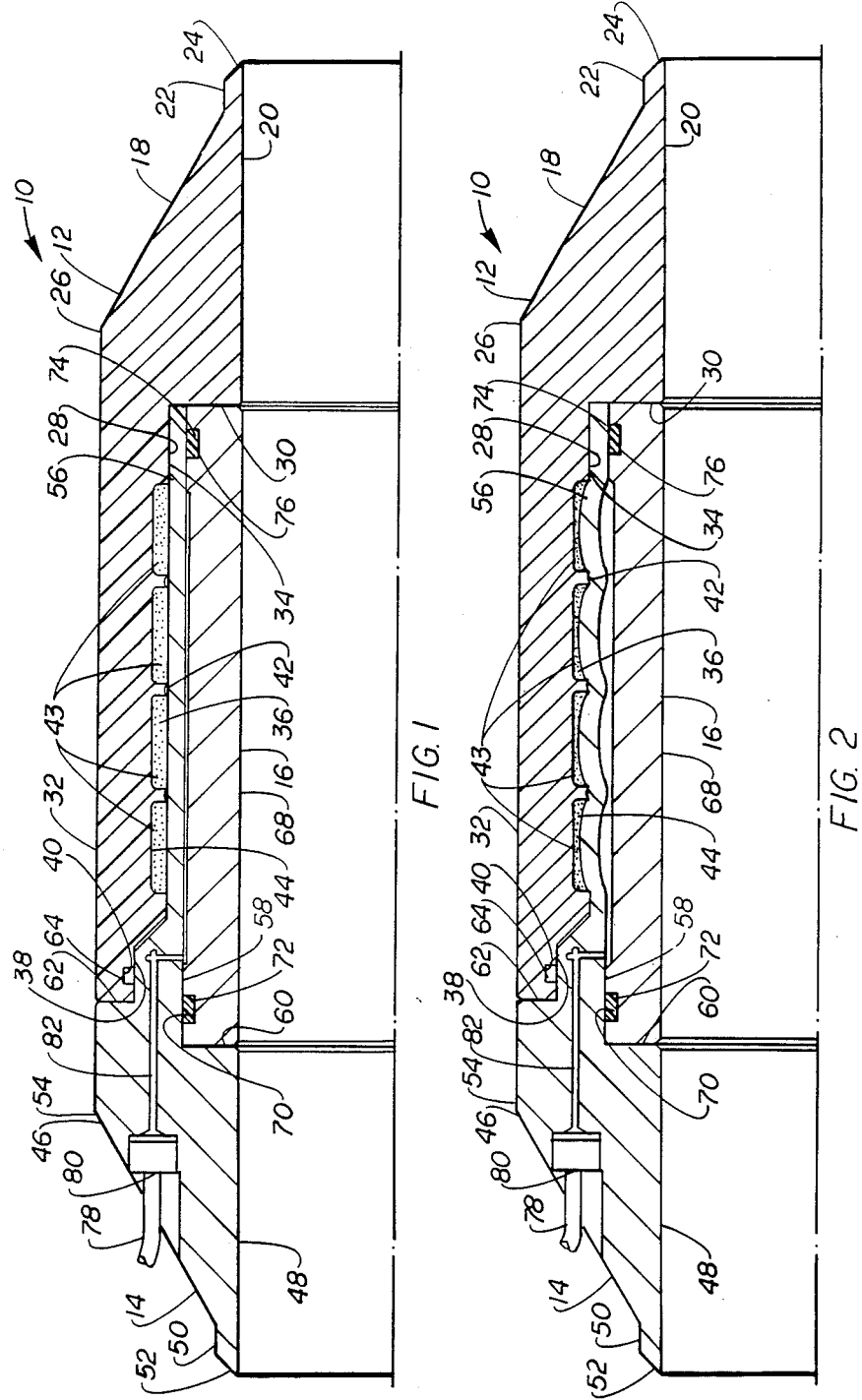

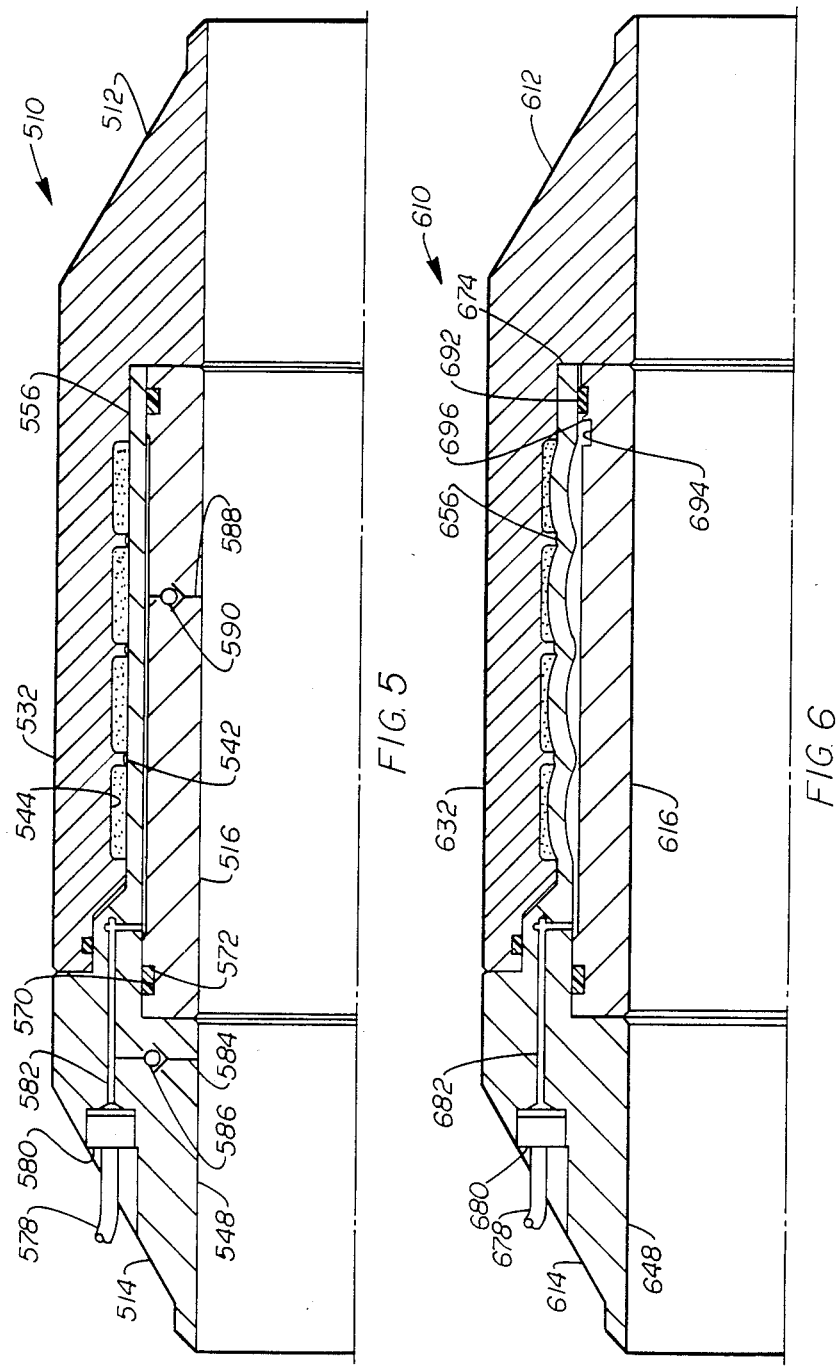

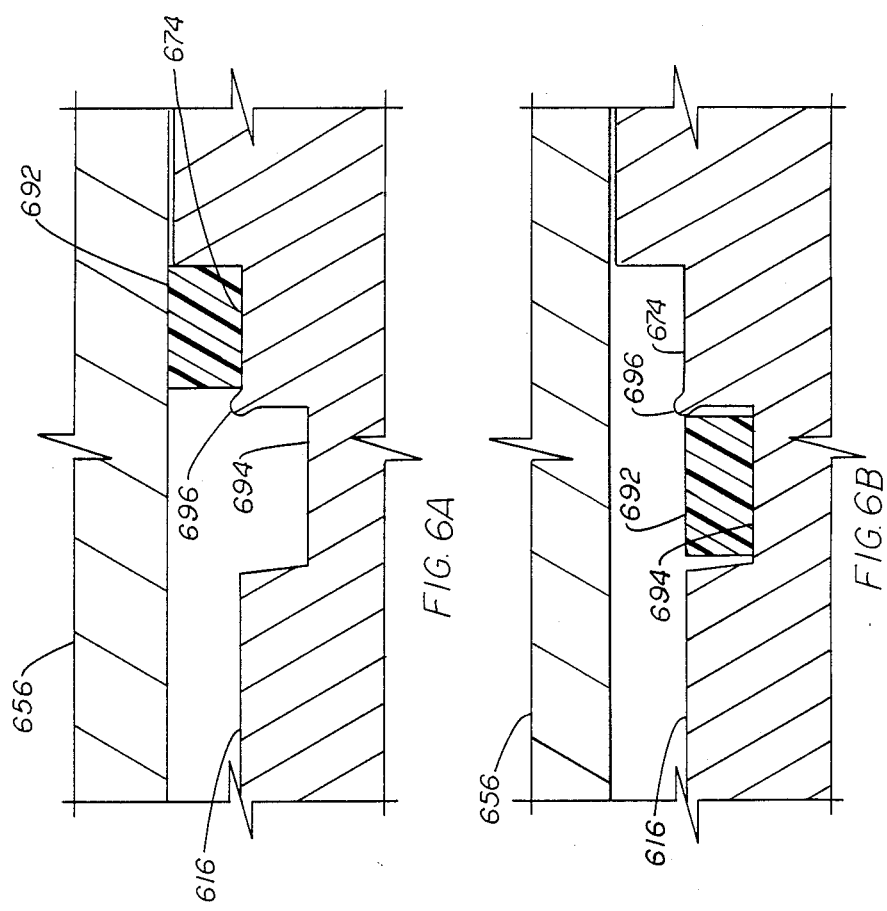

SUBSEA TUBULAR JOINT

BACKGROUND

In the repair of subsea pipelines using mechanical repair systems in situations where the normally preferred welding is not practical, damaged sections are usually removed and then a replacement section is lowered into position and connected to the two open ends of the pipeline. Normally such open ends are provided with suitable connecting means by which the replacement section may be connected to the ends. Normally such connecting means will be a remotely operated connection such as a collet connector which is hydraulically operated and can be controlled by a remotely operated vehicle or by divers at the location. Recently it has become possible to provide a tool which is inserted into the open end of the pipeline to forge the end outwardly into tight gripping and sealing engagement with a flange or other connecting means surrounding the end. It is also normal to include adjustable joints to allow for axial misalignments and to adjust for the length of the replacement pipe section to space the distance between the two open ends of the pipeline. Such forming is disclosed and suggested in U.S. Pat. Nos. 4,388,752 and 4,662,663. Swivel connections are disclosed in U.S. Pat. Nos. 4,195,865, 4,696,494 and 3,727,954. Additionally, expansion joints are disclosed in U.S. Pat. Nos. 4,720,124 and 4,195,865.

It has become a problem to have the tool within the end of the pipeline because it would be much simpler if the tool could be eliminated and the final forming done from the exterior with the replacement section connected thereto. This would avoid the problem of removing the tool after the pipeline end has been forged into the surrounding connector especially for "last end" connections.

SUMMARY

The present invention relates to an improved subsea tubular joint to be used in making connection to the open ends of a subsea pipeline from which a damaged section has been removed. The improved joint includes a first tubular member having a central bore, and an axially extending first rim having an interior land and groove recess therein and internal seal means near the end of said first rim, a second tubular member having a central bore, an axially extending second rim having an outer diameter less than the inner diameter of said first rim on said first tubular member, a sealing surface near the base of said second rim, a sleeve positioned within and spaced slightly inward from said second rim and sealed to the interior of said second rim at a position near the base thereof and at a position near the outer end thereof, means for sealing around the exterior of the sleeve near each end thereof, and a port communicating to the exterior of said sleeve between said sealing means and the space between said sleeve and the interior of said second rim. With this configuration, fluid under pressure applied to said port causes said second rim to be forced outwardly into said land and groove recess to provide a sealing and gripping engagement between the exterior of said second rim and the land and groove recess on the interior of said first rim.

An object is to provide an improved tubular joint which can be pressure formed in a subsea location and does not require a forming tool to be positioned within and removed from the end of the pipeline.

A further object is to provide an improved tubular joint which is pressure formed into a tight sealing and gripping engagement by an exterior source of fluid under pressure.

Another object of the present invention is to provide an improved tubular joint which is pressure formed and can be the last connection of a replacement section in a subsea pipeline repair job which is completed without an internal forming tool which must be removed from within the joint.

Still another object is to provided an improved subsea tubular joint which is pressure formed and in the subsea location and which provides a variance in length to accommodate variations in the distance between the ends of the subsea pipe prior to the pressure forming.

BRIEF DESCRIPTION OF THE DRAWINGS

These and other objects and advantages are hereinafter set forth and explained with reference to the drawings wherein:

FIG. 1 is a partial longitudinal sectional view of the assembled components of the improved tubular joint before final pressure forming of the joint.

FIG. 2 is another similar partial sectional view of the completely formed joint.

FIG. 5 is a similar partial sectional view of still another modified form of the improved joint prior to pressure forming.

FIG. 6 is another partial sectional view of another modified form of the improved joint prior to pressure forming. FIG. 6A is a partial detail view of the improved sealing means restricting flow out of the space between the sleeve and the first member rim prior to and during pressure forming. FIG. 6B is a partial detail view of the improved sealing means position during and after the inflow of fluids from the interior of the joint after pressure forming.

DESCRIPTION OF THE PREFERRED EMBODIMENTS

Figure 3:
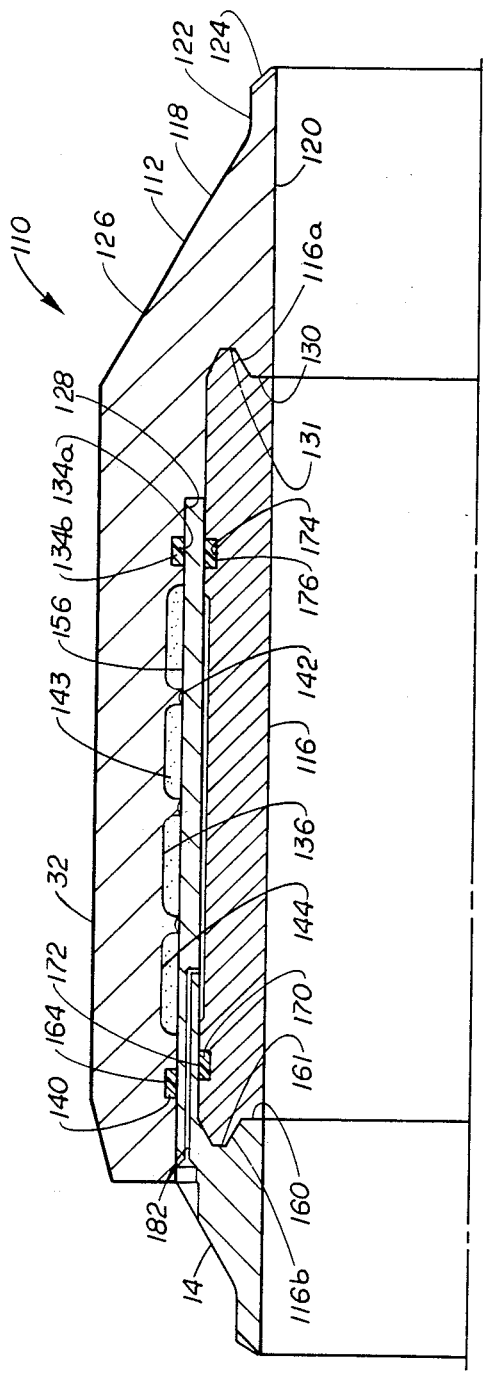
FIG. 3 is another similar partial sectional view of a modified form of the improved joint prior to pressure forming.

As shown in FIG. 1, improved tubular joint 10 includes first tubular member 12, second tubular member 14 and insert sleeve 16. First tubular member 12 includes tubular body 18 with bore 20 extending therethrough. Tubular body 18 includes tubular portion 22 having end preparation 24, suitable for welding to a section of pipe (not shown), and upset portion 26 which has the same internal diameter as bore 20 but has a substantially increased outer diameter with respect to tubular portion 22. Counterbore 28 defines shoulder 30 which faces away from tubular portion 22. Rim 32 extends from the outer part of upset portion 26 in the direction away from tubular portion 22. The interior portion of rim 32 adjacent shoulder 30 is cylindrical surface 34. Outward from cylindrical surface 34 is land and groove recess 36 and the outer interior of rim 32 tapers axially and radially outward terminating in cylindrical surface 38 with sealing groove 40 therein. It is generally preferred that the design of land and groove recess 36 include lands 42 having relatively sharp corners with slight depressions there between and that a suitable volume compensating material 43 be positioned within the grooves 44 to exclude water therefrom. A suitable volume compensating material is microspheres in an epoxy matrix. Second tubular member 14 includes body 46 having central bore 48 therethrough. Body 46 includes tubular portion 50 having end preparation 52, suitable for welding to a section of pipe (not shown), upset portion 54 and axially extending rim 56. Counterbore 58 defines shoulder 60 which faces away from tubular portion 50 of body 46. Rim 56 extends from upset portion 54 of body 46 at a position between internal shoulder 60 and external shoulder 62 and is shaped to be in close spaced relationship to the interior of rim 32 of first tubular member 12 when they are assembled. Seal 64 which is positioned within groove 40 for sealing against the exterior of rim 56. The outer end of rim 56 fits within counterbore 28. Rim 56 is much thinner than rim 32 on first tubular member 12 as it is to be formed outwardly by pressure into tight gripping and sealing engagement with land and groove recess 36.

Sleeve 16 having a central bore 68 which is substantially the same diameter as bores 20 and 48 is positioned within members 12 and 14 between shoulders 30 and 60 as shown. Groove 70 extends around the exterior of sleeve 16 near shoulder 60 and has seal ring 72 positioned therein for sealing against the interior of rim 56 at that position. Groove 74 extends around the exterior of sleeve 16 near shoulder 30 and has seal ring 76 positioned therein for sealing against the interior of rim 56 at that position.

Supply of fluid under pressure is delivered to joint 10 through hose 78, fitting 80 and port 82 which communicates to the space between seal rings 72 and 76 around the exterior of sleeve 16. It is suggested that the exterior of sleeve 16 be of a slightly reduced diameter in this area as shown so that there will be no restriction to the uniform application of fluid pressure delivered thereto through port 82.

It should be noted that both rim 32 and sleeve 16 are relatively thick with respect to rim 56 and it is suggested that rim 32 and sleeve 16 could be made of materials having greater resistance to deformation responsive to the pressure of the fluid supplied for the forming of rim 56 into land and groove recess 36. When sufficient fluid pressure is supplied through hose 78 rim 56 is deformed into tight gripping and sealing engagement with lands 42 to provide a metal to metal seal and to secure first and second tubular members 12 and 14 into fixed engagement with each other and into the improved tubular joint 10 of the present invention.

Improved joint 110, shown in FIG. 3, is a modified tubular joint of the present invention and is substantially the same structure as joint 10 and all components which are the same have received the same numerical designation with the prefix "1" added thereto. The difference in the modified joint 110 is that configuration of the shoulders 130 and 160 which include recesses or grooves 131 and 161 and the ends of sleeve 116 includes mating projections 116a and 116b which are received within the grooves 131 and 161, respectively. It is believed that such interengagement of sleeve 116 in grooves 131 and 161 provides a secure positioning and centering of sleeve 116 in its desired position. This interlocking construction will support the sleeve 116 as the forging pressure is applied. Also, seal 134b in groove 134a in surface 134 provides sealing against the exterior end of rim 156.

Figure 4:
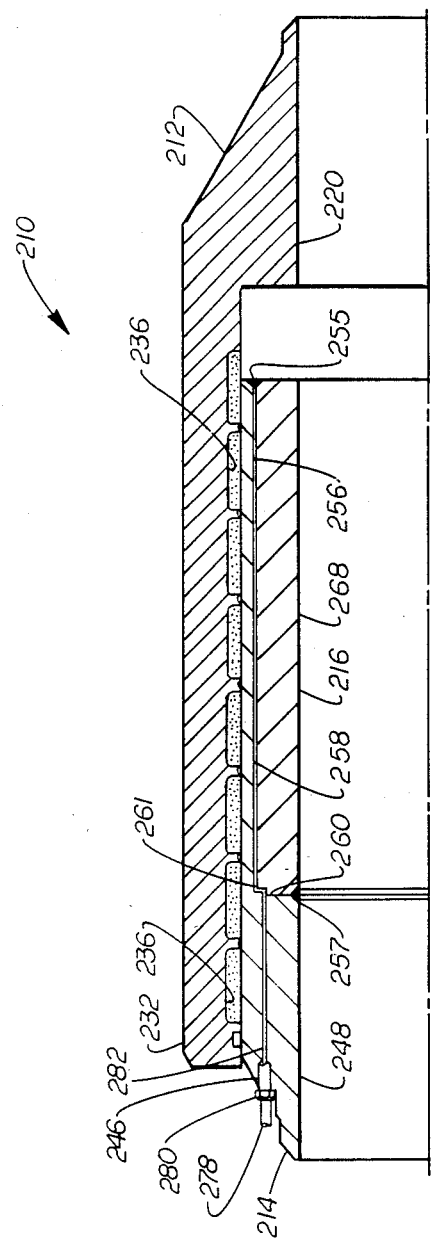
FIG. 4 is a similar partial sectional view of another modified form of the improved joint prior to pressure forming.

Improved joint 210, shown in FIG. 4, is another modified tubular joint of the present invention and has substantially the same construction as joints 10 and 110. In FIG. 4, the components which are alike have received the same numerical designation with the prefix "2" added thereto. The difference in the modified joint 210 is that it provides a configuration in which it may be lengthened or shortened prior to forming to accommodate to the exact length which the joint is to fill between the two ends of pipe to which the two members are secured. Joint 210 includes first tubular member 212 and second tubular member 214 and sleeve 216. Rim 232 of first tubular member 212 is substantially longer and includes land and groove recess 236 along substantially the entire length of its interior surface. Second tubular member 214 includes body 246 having central bore 248 therethrough. Counterbore 258 defines shoulder 260 which is within rim 256. The exterior of rim 256 is substantially straight over its entire length. Sleeve 216 has a central bore 268 which is substantially the same as bores 220 and 248. Sleeve 216 is positioned within rim 256 and is welded as at 257 to the interior of second tubular member 214 as shown. Sleeve 216 is also welded to the end of rim 256 at 255 as shown. With this structure, sleeve 216 is secured within counterbore 258 and is sealed therein by the weldings 255 and 257. Fluid under pressure is delivered to the space 261 between the end of sleeve 216 and shoulder 260 by port 282. Hose 278 which delivers pressure fluid is connected to fitting 280 which is secured within the outer opening of port 282 in the end of body 246 of second tubular member 214. The fluid delivered through port 282 is conducted to the exterior of the space 261 and since the exterior of sleeve 216 is slightly spaced from the interior of rim 256, fluid pressure will be exerted along the entire interior of rim 256 so that it is uniformly deformed into tight sealing and gripping engagement with the land and groove recess 236 on the interior of rim 232.

It should be noted with the specific structure of joint 210 that the axial positioning of second tubular member 214 within rim 232 of first tubular member 212 does not interfere with the pressure forming of the components into a tight joint. By having such axial movement available the improved joint can be used in situations in which there is a slight variation in the length between the members being connected.

Joint 510 illustrated in FIG. 5 is substantially the same as joint 10 shown in FIGS. 1 and 2 and the same parts are given the same numbers in joint 510 with the prefix "5" added thereto. The different feature of these two forms of the invention is the communication which is established between the space between the exterior of the sleeve and the interior of the second tubular member rim. This feature as illustrated in joint 510 is the addition of a passage 584 through tubular member 514 from passage 582 to bore 548. Check valve 586 is positioned in passage 584 to prevent inward flow of pressure fluids into bore 548 but to allow the flow of pressure fluids from within bore 548 into passage 584 and thus into the space between insert sleeve 516 and the interior of rim 556. Passage 588 is shown extending through insert sleeve 516 and includes check valve 590 therein to allow flow outward but to prevent flow inward. While the two passages 584 and 588 are illustrated in FIG. 5 only one of such passages would normally be used.

Joint 610 as illustrated in FIG. 6 is similar to joint 510 except that no passages or line are provided but seal ring 692 is positioned within external groove 674 on the exterior of insert sleeve 616. Deep groove 694 is provided on the exterior of insert sleeve 616 spaced slightly from groove 674 by lip 696. Lip 696 has a reduced height which is specifically designed to support seal ring 692 when it is exposed to fluid pressure exerted between sleeve 616 and rim 656 but when pressure on seal ring 692 is exerted from the interior of joint 610 seal ring 692 is positively moved from within groove 674 as shown in FIG. 6A into deep groove 694 as shown in FIG. 6B. In this position, seal ring 692 no longer seals between the exterior of sleeve 616 and the interior of rim 656 so that fluid pressure from within the bore of joint 610 is free to pass seal ring 692 when it exceeds the pressure behind seal ring 692. In this manner the fluid pressures exerted on the insert sleeve are equalized after the completion of the pressure forming step. It should be noted that the fittings 580 and 680 are preferably a type which may be easily and quickly disconnected and connected by a diver and also include a valving member preventing flow therethrough after it is disconnected. Further it is preferred that a plug be placed in sealing relationship over the opening of the fitting as a double insurance to the sealing to prevent leakage through the fitting.

The improved tubular joint of the present invention provides a joint which is designed for assembly in a subsea location and may be the last joint in a subsea pipeline repair and replacement in that it is completed into a pressure formed joint with metal to metal gripping and sealing engagement without having an internal tool remaining within the pipeline.

What is claimed:

1. A tubular joint comprising
  a first tubular member having a first body with a central bore therethrough, a first rim extending axially therefrom and with a first internal shoulder facing in the direction said first rim extends,
  a second tubular member having a second body with a central bore therethrough, a second rim extending axially therefrom and with a second internal shoulder facing in the direction said second rim extends,
  said second rim having an outer diameter less than the inner diameter of said first rim so that it fits therein,
  said first rim having an internal land and groove recess,
  a sleeve positioned within said first and second rims and between said shoulders and having a central bore therethrough of substantially the same diameter as the diameters of the first and second body central bores,
  sealing means surrounding said sleeve near its ends for sealing against the interior of said second rim, and
  means providing fluid communication through one of said tubular members from the exterior of said tubular members to a position between said sealing means on the exterior of said sleeve and the interior of said second rim,
  said sleeve having sufficient strength to withstand the pressure supplied through said fluid communication means to force said second rim outward against said first rim.

2. A tubular joint according to claim 1 including
  a fitting secured to one of said tubular members in said fluid communication and having means for releasably connecting a pressure fluid hose thereto.

3. A tubular joint according to claim 1 wherein
  said fluid communication includes a port through said second tubular member body.

4. A tubular joint according to claim 1 including
  said second rim positioned in tight gripping and sealing engagement against the interior of said first rim.

5. A tubular joint according to claim 1 wherein said shoulders include a groove therein and said sleeve includes end projections mating with the grooves in said shoulders.

6. A tubular joint according to claim 1 including means for sealing between the exterior base of said second rim and the interior end of said first rim.

7. A tubular joint according to claim 1 wherein said first rim is substantially longer than said second rim, and
  said sleeve is secured and sealed within said second rim.

8. A tubular joint according to claim 1 including a fluid communication means between the exterior of said sleeve and the interior of said sleeve, and
  means for limiting the flow through said fluid communication means in the direction toward the interior of said sleeve.

9. A tubular joint according to claim 8 wherein said fluid communication means and flow limiting means includes
  a passage through said sleeve, and
  a check valve in said passage to prevent flow to the interior of said sleeve.

10. A tubular joint according to claim 8 wherein said fluid communication means and flow limiting means includes
  a passage communicating between the interior of said tubular members and the fluid communication means from the exterior of the tubular members to a position between said sealing means on the exterior of said sleeve, and
  a check valve in said passage to prevent flow to the interior of the tubular members.

11. A tubular joint according to claim 8 wherein said fluid communication means and flow limiting means includes
  said sealing means positioned in a primary groove around the exterior of said sleeve and having a larger secondary groove adjacent thereto and separated from the primary groove by a short lip so that when the seal is exposed to fluid pressure from the interior of the joint it will be moved into the larger secondary groove to allow free flow of fluid to the exterior of said sleeve.

* * * * *